United States Patent [19]
Ryan

[11] 3,779,386
[45] Dec. 18, 1973

[54] FILTER CARTRIDGE

[75] Inventor: Leo F. Ryan, Somerville, N.J.

[73] Assignee: Ecodyne Corporation, Chicago, Ill.

[22] Filed: Mar. 23, 1972

[21] Appl. No.: 237,568

Related U.S. Application Data

[62] Division of Ser. No. 87,661, Nov. 9, 1970, Pat. No. 3,680,700.

[52] U.S. Cl. ............ 210/193, 210/323, 210/436, 210/497
[51] Int. Cl. ............................ B01d 27/02
[58] Field of Search ........... 210/75, 120, 193, 210/232, 323, 436, 497

[56] References Cited
UNITED STATES PATENTS

| | | | |
|---|---|---|---|
| 3,406,831 | 10/1968 | Bush et al. | 210/297 X |
| 3,178,021 | 4/1965 | Bray | 210/75 X |
| 1,137,480 | 4/1915 | Gwynn | 210/497 X |

*Primary Examiner*—Samih N. Zaharna
*Assistant Examiner*—Robert H. Spitzer
*Attorney*—Charles M. Kaplan et al.

[57] ABSTRACT

An improved precoat filter cartridge and a method of applying the precoat medium thereto. The filter cartridge comprises: a vertically extending tubular core element having apertures therein; a filter screen positioned about said core element to receive precoat particles; and a cover member closing off the upper portion of said core element defining a chamber formed by the sides thereof to accumulate gas trapped within said cartridge. A vent hole is provided in said cover member to permit the trapped gas to be vented therethrough.

3 Claims, 2 Drawing Figures

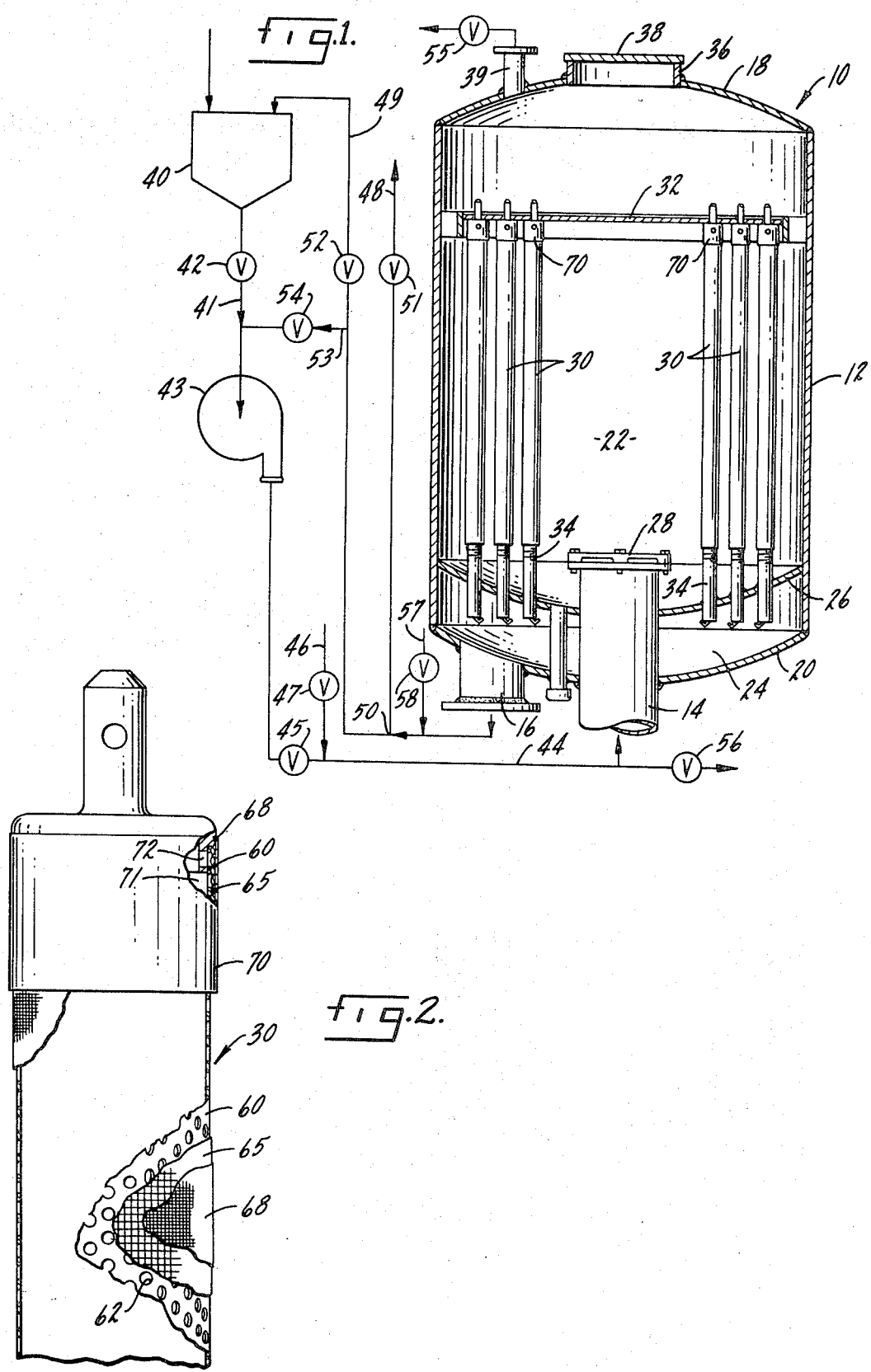

FILTER CARTRIDGE

This is a division, of application Ser. No. 87,661, filed Nov. 9, 1970, now U.S. Pat. No. 3,680,700.

BACKGROUND OF THE INVENTION

The present invention relates to an improved filtration system and more particularly to an improved precoat filter cartridge for applying the precoat medium thereto.

Liquids may be very effectively purified by passing them through a filter screen which has been precoated with a layer of ion exchange resin particles in the size range of 60 to 400 mesh, hereinafter referred to as precoat medium. This method is disclosed in U.S. Pat. No. 3,250,703, issued May 10, 1966, and assigned to the assignee of this invention.

In the typical system of this type a plurality of filter cartridges are spaced within a filter tank. Precoat filter cartridges of this type generally include a core element of suitable corrosion resistant material having openings therethrough. The body portion is covered with a layer of coarse screen which, in turn, is wrapped with a layer of fine mesh screen. In order to precoat the filter cartridges a water slurry of precoat medium is passed through the filter tank. A precoat layer of precoat medium is thereby deposited upon the upstream sides of the filter cartridges. A precoat layer of uniform distribution throughout the entire length of the filter cartridges is desirable for maximum utilization of the system.

It has been discovered that during filling of the filter tank with water a certain amount of air or other gasses are trapped in the upper portion of each filter cartridge due to capillary resistance. This has at least two deleterious effects on the filtration system. Firstly, the gas prevents the flow of slurry through those areas of the cartridges in which it is located and thereby prevents precoating; and secondly, during the filtering cycle of the system, gas is periodically released outwardly through the filter cartridges and disrupts the precoat thereon.

This problem of accumulated gas within the precoat cartridges is especially prevalent with precoat media having low pressure drop characteristics such as powdered ion exchange resins. The only attempts to solve this problem in the past have been attempts to minimize the gas in the incoming water entering the system. This has not been satisfactory because of the obvious difficulty of preventing gas from entering the system.

SUMMARY OF THE INVENTION

It is an object of the present invention to provide a precoat filter cartridge that reduces the accumulation of air or other gasses within the cartridge and thereby permits a more uniform precoat layer to be deposited upon the cartridge.

Another object of the invention is to provide a precoat filter cartridge that includes a vent hole to permit the removal of air or other gasses accumulated therein.

A further object is to provide a precoat filter cartridge that includes a dome cover surrounding the upper portion of the filter cartridge wherein gas may be accumulated so as not to disturb the precoat layer.

A still further object is to provide a precoat filter cartridge that will provide a uniform precoat, especially towards the upper portion of the cartridge.

The present invention provides a precoat filter cartridge having a dome shaped cover around the upper portion of the cartridge. The cover includes a vent hole communicating with the internal portion of the filter cartridge. The invention further provides a method of precoating the cartridges which comprises: a) filling the filter tank with water at a relatively low pressure; b) increasing the pressure of the water within the tank; and c) cycling a precoat slurry through the tank. By increasing the pressure of the water within the tank prior to precoating the accumulated gas is compressed and vented through the hole in the dome shaped cover.

DESCRIPTION OF THE DRAWING

Other objects and advantages of the invention will hereinafter become more fully apparent from the following description of the annexed drawing, which illustrates a preferred embodiment, and wherein:

FIG. 1 is a schematic representation of a filtering system of the type which utilizes the filter cartridges of the present invention; and FIG. 2 is an enlarged partial cross sectional view of one of the filter cartridges illustrated in FIG. 1.

DESCRIPTION OF THE PREFERRED EMBODIMENT

Referring to FIG. 1, there is illustrated schematically a filter system, indicated generally by the reference numeral 10, for removing dissolved and undissolved impurities from water in accordance with the present invention. Although the present invention will be discussed in detail with respect to the purification of water, the present invention has application to the purification of gasses and other liquids.

The filtration system 10 comprises a filter tank 12 having an inlet conduit 14 and an outlet conduit 16. Filter tank 12 is generally a cylindrical vessel made of steel, or the like having outwardly convex top and bottom portions 18 and 20, respectively. Tank 12 is partitioned into an influent zone 22 and an effluent zone 24 by a downwardly convex tube sheet plate 26 suitably secured to the interior of the tank by welding or the like.

Inlet conduit 14 enters tank 12 through the bottom end 20 and passes upwardly through effluent zone 24 and plate 26 to communicate with influent zone 22. Conduit 14 is attatched to plate 26 by welding or the like, so as to preclude fluid leakage from influent zone 22 to effluent zone 24. Fluid entering influent zone 24 through inlet conduit 14 is distributed radially outwardly by distribution plate 28.

Mounted within the influent zone 22 are a plurality of filter cartridges 30 through which the influent stream must pass before entering effluent zone 24 and being discharged from filter tank 12 through outlet conduit 16. Each filter cartridge 30 is held in place in influent zone 22 of filter tank 12 by a holding assembly, indicated generally by reference numeral 32. The selection of a suitable holding assembly would, of course, be within the ordinary skill of one in the art. Holding assembly 32 is adopted to releasably hold filter cartridges 30 in place upon filter seat means 34 which are attached to plate 26. Filter cartridges 30 are placed into and removed from filter tank 12 through a manhole opening 36 in filter tank 12. Manhole opening 36 has a cover means 38 which may be removed or opened, as desired, to provide access to the interior of filter tank 12.

Filter seat means 34 comprises a small pipe made of steel or the like which extends through a hole in plate 26 and is attached to plate 26 by welding or other suitable means. Filter seat means 34 is substantially parallel to the longitudinal axis of filter tank 12 and connects influent zone 22 with effluent zone 24. Filter seat means 34 provides a base for the filter cartridge 30, which is held in position on means 34.

The filter tank is also provided with a vent 39. Vent 39 may be of any suitable construction, the selection of appropriate vent means being dependent generally upon the specific use of the filter system 10.

A water slurry of the particular precoat medium (e.g. finely divided ion exchange resin particles in the size range of about 60 to 400 mesh) is stored in a precoat tank 40. A slurry line 41, controlled by a slurry valve 42, connects precoat tank 40 with a slurry pump 43. A transfer line 44 connects pump 43 with inlet conduit 14 of filter tank 12. A transfer valve 45 adjacent the pump 43 and in transfer line 44 controls the passage of slurry from pump 43.

The water to be treated enters filter system 10 through feed line 46 having an intake control valve 47. Feed line 46 is connected to transfer line 44 between control transfer valve 45 and inlet conduit 14.

Outlet line 16 is connected to a service line 48 and a precoat return line 49 at a T-juncture indicated by reference numeral 50. Service line 48 is connected to service units not shown, such as a steam generator and the like, and has a service valve 51. The precoat return line 49 is connected to the precoat tank 40 and has a return valve 52 to control the flow of slurry back to precoat tank 40. Backwash line 57 is connected to outlet line 16 and has a valve 58 to control the flow of backwash water into tank 12. A bridge line 53 with a bridge valve 54 interconnects the precoat return line 49 and the slurry line 41. Filter system 10 is equipped with a vent valve 55 and drain valve 56.

Referring to FIG. 2, each filter cartridge 30 includes as inner core element 60 of suitable corrosion-resistant material such as aluminum or stainless steel having holes 62 therein. Core element 60 is covered with a layer of coarse drain mesh 65 which, in turn is wrapped with a layer of fine mesh screen 68. Filter cartridge 30 includes a dome shaped cover member 70 closing off the upper portion of core element 60 so as to define a chamber 71 between the side walls thereof. Vent hole 72 passes through the upper portion of cover member 70 so as to permit fluid communication between chamber 71 and influent zone 22. Core element 60 and screens 65 and 68 extend upward beyond vent hole 72 so as to prevent precoat material from entering chamber 71 through vent hole 72.

In preparing the filter system 10 for operation the initial step is to precoat the filter cartridges 30. To these ends, the filter tank 12 is filled with a low impurity water, such as demineralized water, at a relatively low pressure, i.e. approximately 8 p.s.i.. Tank 12 is filled by passing the demineralized water through backwash line 57 and into tank 12 via outlet line 16. During this filling step all the valves are closed, except valve 58 and vent valve 55. Due to capillary resistance air or other gasses may be trapped in the upper portions of cartridges 30 and in chambers 71. The pressure of the water in tank 12 is caused by the back pressure resulting from controlling valve 55. Upon filling tank 12 with demineralized water at a relatively low pressure all valves are closed.

A slurry of precoat medium and demineralized water is prepared in precoat tank 40. The precoating step is initiated by opening slurry valve 42, transfer valve 45 and return valve 52 and starting pump 43, thereby drawing the precoat slurry from precoat tank 40 through transfer line 44 into filter tank 12 via inlet conduit 14. The pressure of the incoming slurry forces the demineralized water in filter tank 12 through screens 68 and 65 and core elements 60 into filter cartridges 30 and out of the filter tank 12 via conduit 16. This demineralized water enters the precoat tank 40 through the return line 49. Return valve 52 is controlled so as to create a back pressure in tank 12 which increases the pressure of the water in tank 12. By increasing the pressure of the water in tank 12 the gas trapped in the upper portions of cartridges 30 are compressed upward into chamber 71 and partially forced out through vent hole 72. Tests have shown that by doubling the pressure in tank 12 from approximately 8 p.s.i. to 16 p.s.i. all the trapped gas in the filter cartridges 30 is forced upward into chamber 71 thereby permitting a uniform precoat over the entire length of the cartridges below cover member 70. This increased pressure is retained in the system during the precoat cycle and the service cycle so as to continue to confine the gas.

As the cycling continues the precoat slurry is brought into contact with the upstream surfaces of the filter screens 68 of filter cartridges 30. The particles of the precoat medium are separated from the slurry and deposited as a precoat layer upon the upstream surfaces of the screens 68. The slurry is circulated through the filter system in this manner until sufficient depth of the precoat is deposited upon the upstream surface of filter screens 68. The precoating step is terminated by closing slurry valve 42 and return valve 52 and opening bridge valve 54. Pump 43 is kept running until the recycle stream is clear. The filter system is now ready to be used to treat the service water.

The service cycle is begun by closing bridge valve 54 and transfer valve 45 and opening service valve 51 and feed valve 47. This step is preferably timed to maintain sufficient pressure in the system to assure retention of the precoat layer on filter screens 68. In this manner, untreated water enters the filter system through feed line 46, passes through transfer line 44 and passes through inlet conduit 14 to influent zone 22. The pressure of the incoming untreated water forces it through the precoat layers, filter screens 68 and 65 and core elements 60 into filter cartridges 30 and out through outlet conduit 16. As the untreated water passes through the precoat layers, impurities are removed from the water. The treated water flows through outlet conduit 16 to service line 48.

Eventually the precoat material will become exhausted and must be replaced. At this time the filtering step is stopped by closing intake valve 47 and service valve 51. Vent valve 55 and drain valve 56 are opened to drain filter tank 12. The filter cartridges 30 are washed by an internal washing system, not described or shown. Another charge of precoat material is then placed in the precoat tank 40 and the process of precoating and filtering described in detail hereinbefore is repeated.

It has been shown that by increasing pressure and venting the top of a filter cartridge so as to compress and expel gas trapped therein; the present invention prevents such gas from blocking flow of a slurry that is depositing a precoat on the cartridge.

Though the apparatus of the present invention has been discussed primarily in connection with a precoat material of finely divided ion exchange resin particles, it may likewise be used where the precoat material is of another material such as diatomaceous earth, or any other precoat materials, as will be understood by those skilled in the art.

Obviously, many modifications and variations of the present invention as hereinafter set forth will occur to those skilled in the art, and it is intended to cover in the appended claims all such modifications and variations as fall within the true spirit and scope of the invention.

What is claimed is:

1. In a liquid filtering apparatus including a filter tank, a plate separating said tank into an upper influent compartment and a lower filtrate compartment, a plurality of annular filter cartridges vertically mounted in said influent compartment, and precoat means including means for distributing precoat particles on said filter cartridges; each of said filter cartridges comprising:
   a. a vertically extending tubular core element having apertures therin;
   b. a filter screen positioned about said core element to receive said precoat particles; and
   c. cover member means closing off the upper portion of said core element defining a chamber having substantially imperforate walls formed by the sides thereof in direct and free communication with said filter cartridge interior for accumulating gas trapped within said filter cartridge upon increase of the liquid pressure within said tank in an area remote from the filtering area of said filter cartridge so as to permit said precoat to deposit on said filtering area in a uniform layer.

2. The precoat filter cartridge as defined in claim 1 wherein said cover memeber means includes a vent hole passing therethrough so as to permit said trapped gas to be vented therethrough.

3. The precoat filter cartridge as defined in claim 2 wherein said filter screen covers said vent hole.

* * * * *